(12) United States Patent
Miethig

(10) Patent No.: US 11,345,282 B2
(45) Date of Patent: May 31, 2022

(54) CAMERA ARM OF A CAMERA-BASED MIRROR SUBSTITUTE SYSTEM FOR A MOTOR VEHICLE

(71) Applicant: Continental Automotive GmbH, Hannover (DE)

(72) Inventor: Werner Miethig, Brigachtal (DE)

(73) Assignee: Continental Automotive GmbH

( * ) Notice: Subject to any disclaimer, the term of this patent is extended or adjusted under 35 U.S.C. 154(b) by 0 days.

(21) Appl. No.: 16/908,118

(22) Filed: Jun. 22, 2020

(65) Prior Publication Data
US 2020/0317130 A1 Oct. 8, 2020

Related U.S. Application Data

(63) Continuation of application No. PCT/EP2018/082746, filed on Nov. 27, 2018.

(30) Foreign Application Priority Data

Dec. 22, 2017 (DE) ..................... 10 2017 223 732.5
Apr. 17, 2018 (DE) ..................... 10 2018 205 849.0

(51) Int. Cl.
*B60R 1/12* (2006.01)
*B60K 35/00* (2006.01)
(Continued)

(52) U.S. Cl.
CPC ................ *B60R 1/12* (2013.01); *B60K 35/00* (2013.01); *B60R 1/006* (2013.01); *B60R 11/04* (2013.01);
(Continued)

(58) Field of Classification Search
CPC ........... B60R 1/12; B60R 1/006; B60R 11/04; B60R 2011/0042; B60R 2011/0084;
(Continued)

(56) References Cited

U.S. PATENT DOCUMENTS 6,454,420 B1 9/2002 Serrano Fernandez et al.
2002/0148089 A1* 10/2002 Frenken ................ B21J 15/323
29/243.53
(Continued)

FOREIGN PATENT DOCUMENTS

DE 3529215 A1 2/1987
DE 202010008150 U1 10/2010
(Continued)

OTHER PUBLICATIONS

Office Action dated Dec. 21, 2018 from corresponding German Patent Application No. DE 10 2018 205 849.0.
(Continued)

*Primary Examiner* — Joseph Suh

(57) ABSTRACT

A camera arm of a camera system for a vehicle comprises a first structural element connecting the camera arm to the vehicle and a second structural element comprises at least one camera. A fastening for the at least one camera offers protection against external damaging influences on the fastening, the camera arm, and on all elements, devices, and modules arranged thereon. The camera arm comprises a variable-volume fluid vessel, connecting the first and the second structural element to one another. At least one restoring element connects the first and the second structural element to one another. The restoring element exerts a force on the second structural element in the direction of the first structural element. The force is varied as a result of the amount of fluid in the fluid vessel, such that the second structural element is moved relative to the first structural element by the varying force.

6 Claims, 2 Drawing Sheets

(51) Int. Cl.
    *B60R 11/04*     (2006.01)
    *H04N 5/225*     (2006.01)
    *B60R 1/00*     (2022.01)
    *B60R 11/00*     (2006.01)

(52) U.S. Cl.
    CPC ....... *H04N 5/2252* (2013.01); *B60K 2370/21* (2019.05); *B60R 2001/1253* (2013.01); *B60R 2011/004* (2013.01); *B60R 2011/0042* (2013.01); *B60R 2011/0082* (2013.01); *B60R 2011/0084* (2013.01)

(58) Field of Classification Search
    CPC ....... B60R 2011/004; B60R 2001/1253; B60R 2011/0082; B60R 2300/8046; B60R 1/00; B60R 2011/0092; B60K 35/00; B60K 2370/21; H04N 5/2252
    See application file for complete search history.

(56) References Cited

U.S. PATENT DOCUMENTS

| | | | | |
|---|---|---|---|---|
| 2008/0246234 | A1* | 10/2008 | Krauss | B60G 17/0155 |
| | | | | 280/5.514 |
| 2014/0063245 | A1* | 3/2014 | Bowers | B60R 1/0607 |
| | | | | 348/148 |
| 2014/0217664 | A1* | 8/2014 | Willems | B60G 11/62 |
| | | | | 267/259 |
| 2015/0059384 | A1* | 3/2015 | Burd | B64D 11/04 |
| | | | | 62/239 |
| 2015/0258987 | A1* | 9/2015 | Kim | B60W 10/02 |
| | | | | 477/5 |
| 2016/0065796 | A1 | 3/2016 | Happy et al. | |
| 2016/0243988 | A1 | 8/2016 | Peterson et al. | |
| 2017/0314583 | A1* | 11/2017 | Koscielniak | E05F 3/224 |
| 2019/0092333 | A1* | 3/2019 | Ishioka | B60Q 1/346 |
| 2019/0161013 | A1* | 5/2019 | Mercado Velazquillo | |
| | | | | B60R 1/0602 |
| 2019/0187250 | A1* | 6/2019 | Ru | G01S 7/4021 |

FOREIGN PATENT DOCUMENTS

| | | |
|---|---|---|
| DE | 102012015395 B3 | 11/2013 |
| DE | 102016102508 A1 | 8/2017 |
| EP | 2955065 A1 | 12/2015 |
| JP | 2000349529 A | 12/2000 |
| JP | 2003063310 A | 3/2003 |
| JP | 2004322799 A | 11/2004 |
| JP | 2016016774 A | 2/2016 |

OTHER PUBLICATIONS

International Search Report and Written Opinion dated Mar. 22, 2019 from corresponding International Patent Application No. PCT/EP2018/082746.

* cited by examiner

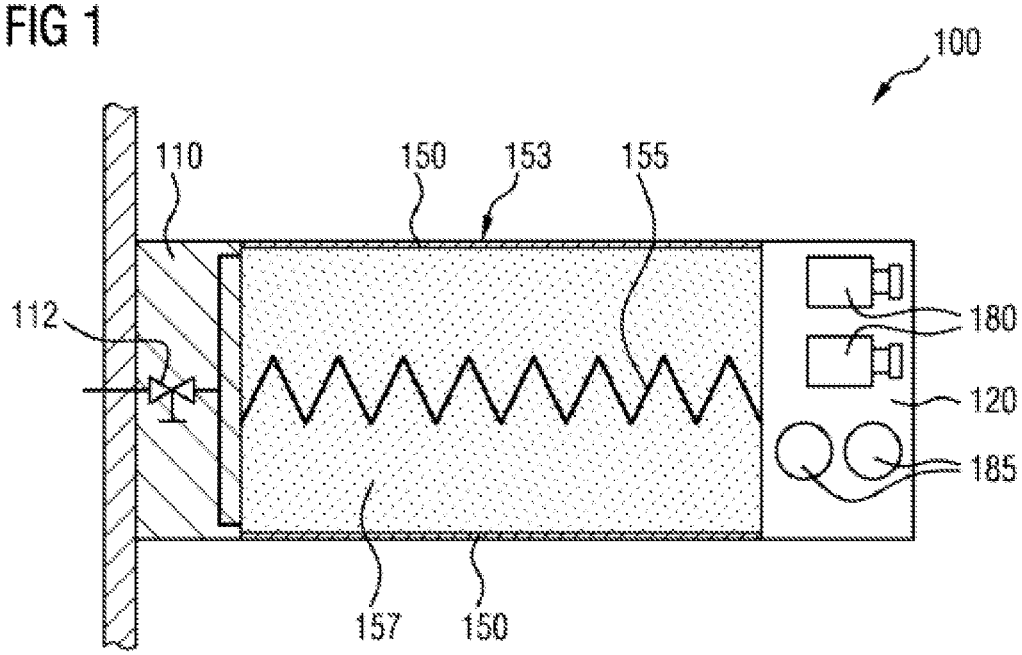
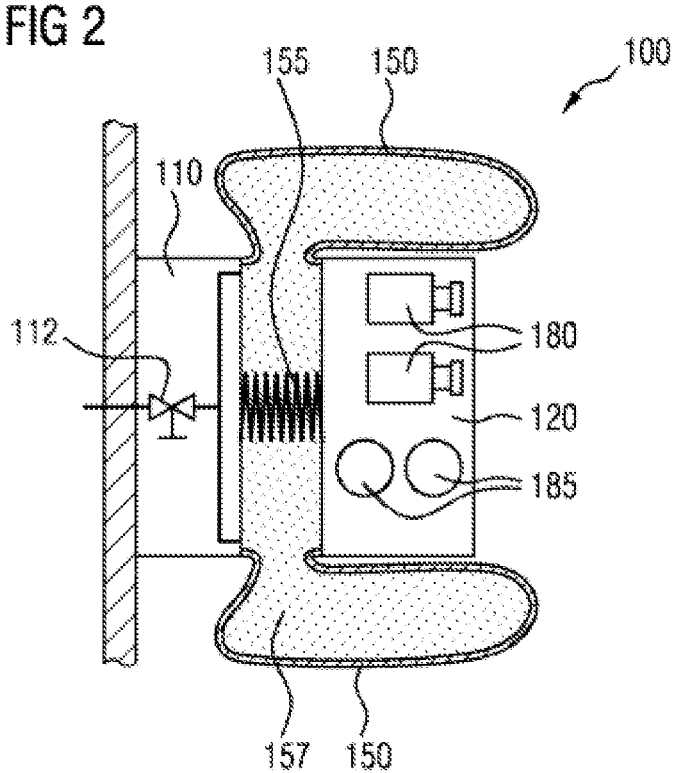

CAMERA ARM OF A CAMERA-BASED MIRROR SUBSTITUTE SYSTEM FOR A MOTOR VEHICLE

CROSS-REFERENCE TO RELATED APPLICATIONS

This U.S. patent application claims the benefit of PCT patent application No. PCT/EP2018/082746, filed Nov. 27, 2018, which claims the benefit of German patent applications No. 10 2017 223 732.5, filed Dec. 22, 2017 and 10 2018 205 849.0 filed Apr. 17, 2018, all of which are hereby incorporated by reference.

TECHNICAL FIELD

The invention relates to a camera arm of a camera-based mirror substitute system for a motor vehicle.

BACKGROUND

Rear-view mirrors, which grant a driver of a motor vehicle a view toward the rear, are ubiquitous and legally prescribed in motor vehicles. In the future, it is intended for the customary rear-view mirrors to be substituted by camera monitor systems. In this way, a view toward the rear is granted in that images recorded by cameras are displayed on monitors to a driver of a motor vehicle.

For such camera-based mirror substitute systems for commercial vehicles, it is expedient not to mount the cameras directly on the vehicle body, but to space them apart therefrom. Known rear-view mirrors are at a certain distance from the vehicle body. As a result, a favorable field of view is afforded, for example. In this case, distances between the mirror and the body of the order of magnitude of 5 cm to several tens of centimeters are customary, for example 80 cm for a particularly wide field of view in the case of greatly out-swinging vehicle combinations, heavy-duty transporters, agricultural machines, mining vehicles and equipment.

For an arrangement of cameras of camera-based mirror substitute systems on vehicles, in particular as a substitute for exterior mirrors or side mirrors, it is therefore desirable to also arrange the cameras at a distance from the body. To this end, use can be made of camera arms, which can be attached, for example, to vehicle cabins.

Rigid arrangements of cameras do not offer the cameras and further modules, elements and devices arranged with the cameras on the camera arms adequate protection against damaging external influences, such as forces from all sides, impact loads and shock loads. Rigid fastenings are sensitive to the potential damaging effects of mechanical force application.

Therefore it is desirable to provide a fastening (in the form of a camera arm) for cameras of camera monitor systems for mirror substitution in motor vehicles, said fastening offering protection against external damaging influences on the fastening or the camera arm and on all elements, devices and modules, in particular cameras, arranged thereon, and enabling an optimum image field of the camera.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A camera arm of a camera-based mirror substitute system for a motor vehicle comprises a first structural element for connecting the camera arm to a motor vehicle and a second structural element which comprises at least one camera. A variable-volume fluid vessel connects the first structural element and the second structural element to one another directly or by way of one or more intermediary elements. At least one restoring element connects the first structural element and the second structural element to one another directly or by way of one or more intermediary elements and pulls the second structural element in the direction of the first structural element. In this case, the second structural element can be moved relative to the first structural element by virtue of the amount of fluid located in the fluid vessel being changed.

The variable-volume fluid vessel expands when the amount of fluid in the fluid vessel is increased, and the variable-volume fluid vessel shrinks when the amount of fluid in the variable-volume fluid vessel is reduced.

The second structural element assumes a position which is at a maximum distance from the first structural element when the fluid vessel of the camera arm is flooded with the working fluid, that is to say has the maximum or almost the maximum fill level, for example more than 95% or more than 99% of the fill capacity.

The second structural element assumes a position which is at a minimum distance from the first structural element when the fluid vessel contains less than a predetermined minimum amount, since, with a low fill level of the fluid vessel, the restoring element effects a force counter to an expansion of the fluid vessel, and therefore, when the fluid flows out of the fluid vessel, the second structural element is moved to the position with the smallest spacing from the first fluid element.

In one embodiment of a camera arm, the variable-volume fluid vessel is suitable for accommodating a variable volume as a result of the fact that the fluid vessel comprises a telescope-like expansion area. By way of example, a part of the fluid vessel can be designed in the form of a cylindrical telescope-like area, that is to say with concentric inter-engaging cylinder jacket elements which engage in one another.

In another embodiment, the fluid vessel comprises an elastic wall at least in partial areas. In this embodiment, the variable-volume fluid vessel can thus be expanded.

The terms image area, area of vision, field of vision and field of view are to be understood synonymously: An area of vision of a camera represents the area that a camera "sees". Said camera relays said area in the form of an image. Accordingly, the image area results from the area of vision. However, the area of vision of said camera also corresponds to the field of vision. Field of view is in any case a synonym for field of view. Viewing angle can be understood to mean an angle which defines a field of view. Viewing angle is also a synonym for perspective.

In another embodiment of a camera arm, the fluid vessel comprises a rolling bellows or is embodied substantially in the form of a rolling bellows. This results in a compact, robust constitution of such a camera arm.

In a further embodiment of a camera arm proposed here having a variable-volume fluid vessel which comprises a rolling bellows or having a variable-volume fluid vessel which is embodied substantially in the form of a rolling bellows, the rolling bellows is composed of an elastomer material. This produces a camera arm which is resistant to environmental influences.

In a further embodiment of a camera arm proposed here, the restoring element or elements are designed in the form of springs. The use springs as restoring elements is the springs have wide availability and low costs.

In a further embodiment of a camera arm proposed here having a restoring element which is designed in the form of a spring or having restoring elements which are designed in the form of springs, the restoring element or elements are embodied in the form of spiral springs. Spiral springs as restoring elements provide their linear spring constant over a readily selectable working range.

In a further embodiment of a camera arm proposed here, the variable-volume fluid vessel is designed for the use of compressed air as fluid. Using compressed air as fluid provides, firstly, that refilling of the fluid can be omitted, since compressed air can be obtained virtually anywhere. Secondly, vehicles are frequently already equipped with a compressed-air infrastructure. This relates in particular to commercial vehicles, such as heavy goods vehicles and agricultural vehicles but also vehicles in the mining industry. Especially in the case of heavy goods vehicles, there is also often a signal horn on the cabin roof—and thus in the vicinity of conventional mirrors, that is to say also in the vicinity of the use location of mirror substitute systems.

In a further embodiment of a camera arm proposed here, the variable-volume fluid vessel is of double-walled embodiment. A double-walled embodiment can either be of robust type or otherwise make it possible for the working fluid to be located only between the two walls of the double-walled vessel and thus for a fluid-free inner space of the vessel to be created.

In a further embodiment of a camera arm proposed here having a variable-volume fluid vessel of double-walled embodiment, the fluid vessel is designed such that the fluid in the filled fluid vessel assumes the shape of a cylinder jacket. The fluid vessel being constituted in such a way that, in the filled state, the fluid as a whole assumes the shape of a cylinder jacket this may useful in that a cylinder jacket, with its tube-like shape, has good mechanical stiffness. The fluid and the pressure thereof maintain the shape of the fluid vessel in the filled state. Further, said shaping is efficient.

A further embodiment of a camera arm proposed here comprises more than one camera. Firstly, this results in the that, if the intention is to cover a single field of view, additional information, for example depth information, about the image content can be obtained. Secondly, it is possible in this case to combine cameras with different image-capturing properties; for example a camera with telephoto properties and a camera with wide-angle properties.

In a further embodiment of a camera arm proposed here, the at least two cameras cover at least two different fields of view. Firstly, this has the result that different viewing angles can be covered with cameras from a single camera arm. Secondly, it is possible in this case to combine cameras with different image-capturing properties; for example a camera with telephoto properties for a narrow image area, which reaches into the distance, possibly to the horizon, and a camera with wide-angle properties for a wide image area.

In a further embodiment of a camera arm proposed here, which comprises more than one camera and in which the at least two cameras cover at least two different image areas or at least partially cover the same image area, the second structural element comprises the at least two cameras.

Firstly, this results in an arrangement of the cameras which is spaced far apart from the vehicle. Secondly, this also has the result that, as a result of the exchange of the second structural element, for example in the case of maintenance or repair work, the at least two cameras are exchanged all at once in one operation.

In a further embodiment of a camera arm proposed here, which comprises more than one camera and in which the at least two cameras cover at least two different fields of view or at least partially cover the same field of view, the first structural element comprises at least one camera and the second structural element comprises at least one camera. This makes it possible for the at least two cameras to cover image areas which differ from one another to a greater extent.

In a further embodiment of a camera arm proposed here, the second structural element additionally comprises at least one mirror. This makes it possible to use the mirror in an emergency situation in order to ensure visibility, for example if a problem occurs concerning the power supply of the mirror substitute system or if other malfunctions occur.

A further embodiment of a camera arm proposed here additionally comprises sensors. This has the result that said sensors can also be arranged at otherwise inaccessible positions on the vehicle, since a camera arm protrudes beyond the vehicle itself. Furthermore, the sensors used can for example to make improved or enhanced functionality of the camera arm outfitted therewith possible, for example by virtue of distance sensors, for example ultrasonic sensors, being arranged in such an arm and the latter being able to be folded in by means of a control unit if an obstacle which may collide with said arm is detected. Such distance warning systems can for example be provided in the manner of ultrasonic distance warning systems which are used as parking aids in passenger cars.

Further in one embodiment, the second structural element comprises the additional sensor or sensors.

A further embodiment of a camera arm proposed here additionally comprises communication apparatuses. This makes it possible to utilize a camera arm, which is outfitted in such a manner, for communication. Communication apparatuses in this context can for example be lamps, lights, indicator lights and/or loudspeakers and/or microphones.

Further in one embodiment, the second structural element comprises the communication apparatuses.

A embodiment of a camera arm proposed here additionally comprises one or more of the following devices: a radio antenna for communication, a position light, a heating element, a cleaning device for cleaning camera lenses or camera covers. By way of example, arrangement of a radio antenna can make improved reception and transmission properties for the antenna possible. Heating elements can provide freedom from ice and work against the accumulation of water on cameras or camera arms. Cleaning devices for cleaning camera lenses or camera covers can improve the operation of the cameras. Position lights can be arranged on the camera arm in order to thereby draw attention to the position which is occupied by the camera arm.

Further in one embodiment, the second structural element comprises the additional devices, such as radio antenna, position light, heating elements, etc.

The radio antenna can for example be utilized for digital communication, for example for vehicle-to-vehicle communication or vehicle-to-infrastructure communication or for mobile radio or Wireless Local Area Network connections or for DSRC or for NFC or for mobile radio (for example for GSM, UMTS, LTE, 2G, 3G, 4G, 5G, LTE light, 2.5G, etc.)

or for receiving GNSS signals and signals of similar systems (for example Galileo, GPS, Glonass, Beidou, QZSS, GAGAN, etc.) or for digital radio reception DAB. The integration of an antenna into a camera arm affords improved reception.

A radio antenna for communication can also be an antenna for communication with infrastructure or with other vehicles, for example via WIMAX, WIFI, NFC or Bluetooth.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 shows a sectional drawing of an exemplary embodiment of a camera arm in a first operating state, FIG. 2 shows a sectional drawing of the same exemplary embodiment of a camera arm as in FIG. 1 but in a second operating state (which is different from the first operating state).

DETAILED DESCRIPTION

Figure 3:
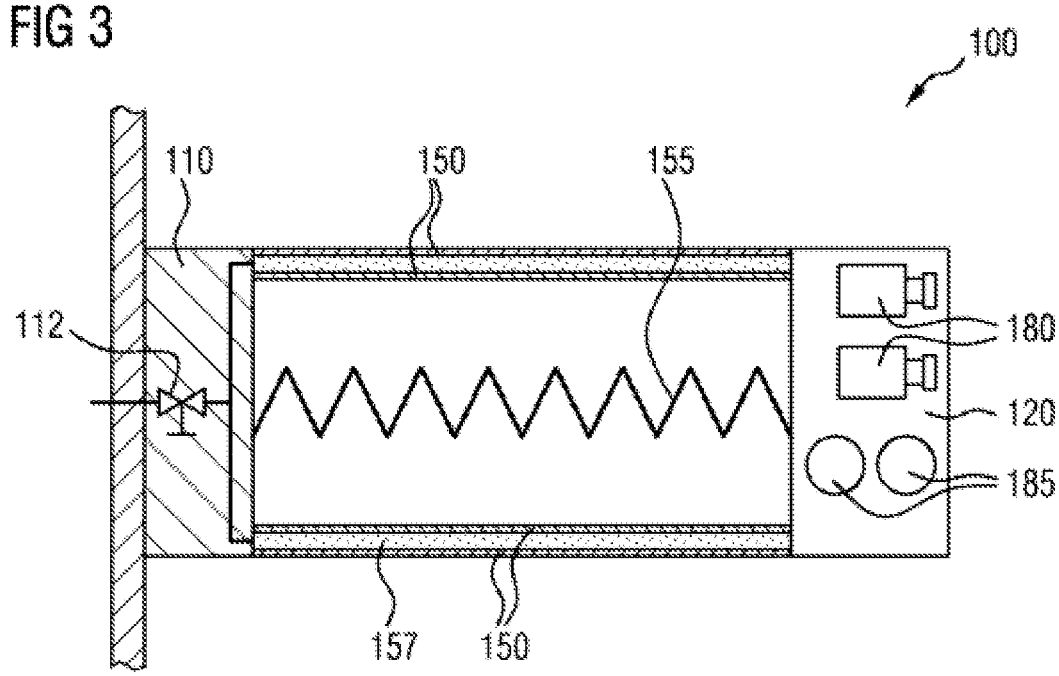
FIG. 3 shows a sectional drawing of an exemplary embodiment of a camera arm in a first operating state.

The following description of the preferred embodiment(s) is merely exemplary in nature and is in no way intended to limit the invention, its application, or uses. Identical elements or elements of the same type or with equivalent actions may be denoted by the same reference signs throughout the figures.

FIG. 1 shows a camera arm 100 in a first operating state, in which the camera arm is located in an extended position, that is to say in an operating position for example for driving operation of a motor vehicle on which the camera arm 100 can be arranged. Here, the variable-volume fluid vessel 150 is filled with the fluid 157, and the second structural element 120 of the camera arm 100 has assumed the maximum distance from the first structural element 110. In the illustration shown, at least two cameras 180 and two additional sensors 185 are arranged on the second structural element 120. The restoring element 155 is expanded to a great extent here and is designed in the form of a spring, for example in the form of a spiral spring. A fluid valve 112, which is used during the changing of the amount of fluid 157 in the fluid vessel 150, is arranged in the first structural element 110. In the exemplary embodiment shown, the walls of the variable-volume fluid vessel 150 can be made of a flexible material, for example an elastomer material. This results in a small amount of flexibility of the camera arm 100 even without variation in the amount of fluid 157, and increased robustness as a result. The camera arm shown in FIG. 1 comprises a fluid vessel 150 with a rolling bellows 153.

If the wall material of the fluid vessel 150 is damaged and the fluid 157 escapes, then the restoring element 155 pulls the second structural element 120 of the camera arm 100 toward the first structural element 110 of the camera arm, which can be fixedly connected to a vehicle, for example to a cabin. In this case, the camera arm 100 thus assumes an operating state with arm retracted, said state also being able to be referred to as a protective state. However, said state can also be achieved by changing the amount of fluid 157, without damaging the fluid vessel 150.

FIG. 2 shows such a state in which the camera arm 100 is retracted, that is to say the second structural element 120 is located as tightly as possible against the first structural element 110 of the camera arm 100. FIG. 2 leaves it open as to whether the situation shown is intentional or produced as a result of damage to the fluid vessel 150. In both cases, the amount of fluid 157 in the fluid vessel 150 is similarly at a minimum level. In said situation, the restoring element 155 is completely contracted: The second structural element 120 has moved closer to the first structural element 110.

FIGS. 1 and 2 show the same camera arm, with FIG. 1 showing the extended state, the operating state. By contrast, FIG. 2 shows the protective state, the retracted state of the camera arm.

Figure 4:
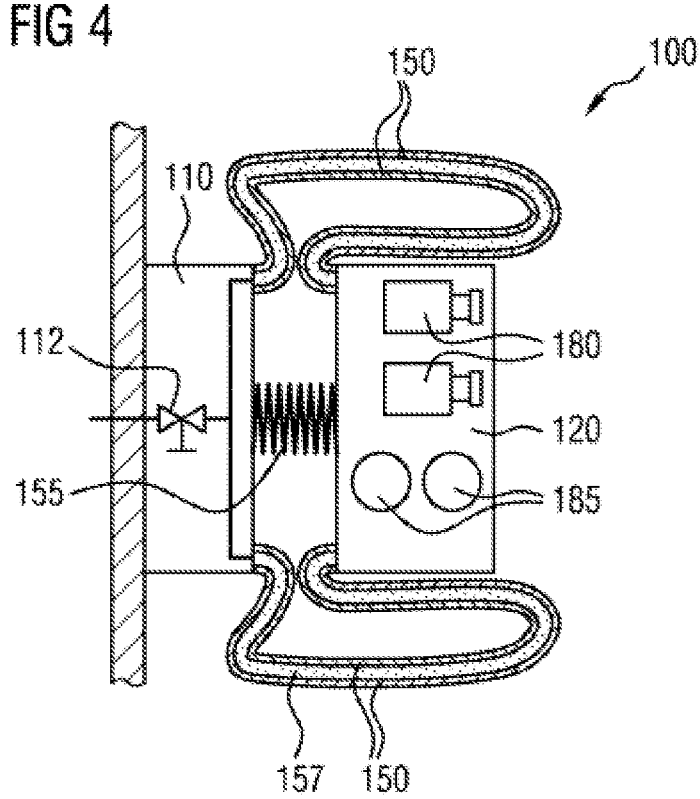
FIG. 4 shows a sectional drawing of the same exemplary embodiment of a camera arm as in FIG. 3 but in a second operating state (which is different from the first operating state).

Analogously, FIGS. 3 and 4 show the same camera arm, once in the operating state (FIG. 3) and once in the protective state (FIG. 4). The camera arm from FIGS. 3 and 4 differs from the camera arm 100 shown in FIGS. 1 and 2 in that it is double-walled. In the embodiment shown, the fluid vessel 150 is designed such that, in the filled state thereof, the fluid as a whole has the shape of a cylinder jacket.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A camera arm of a camera-based mirror substitute system for a motor vehicle comprising:
   a first structural element connecting the camera arm to the motor vehicle;
   a second structural element, which comprises at least one camera;
   a variable-volume fluid vessel, which connects the first structural element and the second structural element to one another directly or by at least one intermediary elements;
   at least one restoring element, which connects the first structural element and the second structural element to one another directly or by way of at least one intermediary elements;
   wherein the at least one restoring element exerts a force on the second structural element in the direction of the first structural element, and wherein the force exerted by the at least one restoring element is varied as a result of the amount of fluid located in the fluid vessel, such that the second structural element is moved relative to the first structural element by the varying force; and
   wherein the first structural element further comprises at least one camera and the second structural element further comprises at least one camera.

2. The camera arm as claimed in claim 1, wherein the fluid vessel further comprises a rolling bellows or a device acting as a rolling bellows.

3. The camera arm as claimed in claim 2, wherein the rolling bellows is composed of an elastomer material.

4. The camera arm as claimed in claim 1 wherein the at least one restoring element is a spiral spring.

5. The camera arm as claimed in claim 1, wherein the fluid vessel is double-walled, and wherein the fluid is located between the double-walls, and wherein the double-walls are shaped such that the fluid assumes the shape of a cylinder jacket.

6. The camera arm as claimed in claim 1, wherein at least two cameras cover at least two different image areas.

* * * * *